United States Patent
Brady et al.

(10) Patent No.: US 10,249,008 B2
(45) Date of Patent: Apr. 2, 2019

(54) METHOD, COMPUTER-READABLE STORAGE DEVICE, AND APPARATUS FOR ADDRESSING A PROBLEM IN A NETWORK USING SOCIAL MEDIA

(71) Applicant: AT&T Intellectual Property I, L.P., Atlanta, GA (US)

(72) Inventors: Mark Brady, Stanford, CA (US); Zhengye Liu, Pleasanton, CA (US); Stephen A. Sposato, Lafayette, CA (US); Jin Wang, Fremont, CA (US); Xidong Wu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1082 days.

(21) Appl. No.: 14/104,726

(22) Filed: Dec. 12, 2013

(65) Prior Publication Data
US 2015/0170293 A1    Jun. 18, 2015

(51) Int. Cl.
G06Q 10/00 (2012.01)
G06Q 50/00 (2012.01)
H04L 12/58 (2006.01)

(52) U.S. Cl.
CPC ............. *G06Q 50/01* (2013.01); *G06Q 10/00* (2013.01); *H04L 51/32* (2013.01)

(58) Field of Classification Search
CPC ......... G06Q 50/01; G06Q 10/00; H04L 51/32
USPC ......................................................... 705/319
See application file for complete search history.

(56) References Cited

U.S. PATENT DOCUMENTS

| | | | |
|---|---|---|---|
| 7,974,983 B2 | 7/2011 | Goeldi | |
| 8,200,527 B1 | 6/2012 | Thompson et al. | |
| 8,515,049 B2 | 8/2013 | Chavez et al. | |
| 8,539,018 B2 | 9/2013 | Bisdikian et al. | |
| 2003/0046426 A1* | 3/2003 | Nguyen | H04L 41/0681 709/242 |
| 2008/0249764 A1 | 10/2008 | Huang et al. | |
| 2010/0293560 A1 | 11/2010 | Bland et al. | |
| 2010/0312769 A1 | 12/2010 | Bailey et al. | |
| 2011/0004483 A1 | 1/2011 | Ting et al. | |
| 2011/0246574 A1 | 10/2011 | Lento et al. | |
| 2011/0264531 A1 | 10/2011 | Bhatia et al. | |

(Continued)

FOREIGN PATENT DOCUMENTS

WO    WO 2012100067 A1    7/2012

OTHER PUBLICATIONS

Wang, Ting, et al. "Spatio-temporal patterns in network events." Proceedings of the 6th International Conference. ACM, 2010. http://citeseerx.ist.psu.edu/viewdoc/download?doi=10.1.1.186.1815&rep=rep1&type=pdf.

(Continued)

*Primary Examiner* — Gabrielle A McCormick

(57) ABSTRACT

A method, computer-readable storage device and apparatus for addressing a problem in a network using social media are disclosed. For example, the method receives social media data, analyzes the social media data to detect a trend for a service provided by the communication network, wherein the trend indicates a problem with the service, correlates an operational parameter of the communication network providing the service to the problem with the service and adjusts the operational parameter of the communication network to address the problem.

20 Claims, 3 Drawing Sheets

(56) References Cited

U.S. PATENT DOCUMENTS

| | | | |
|---|---|---|---|
| 2011/0288899 A1* | 11/2011 | Shah | C02F 1/001 705/7.13 |
| 2012/0005106 A1 | 1/2012 | Famous | |
| 2012/0016948 A1* | 1/2012 | Sinha | G06Q 10/10 709/207 |
| 2012/0047219 A1 | 2/2012 | Feng et al. | |
| 2012/0072358 A1 | 3/2012 | Famous et al. | |
| 2012/0130918 A1 | 5/2012 | Gordon | |
| 2012/0198357 A1 | 8/2012 | Tozzi | |
| 2013/0024389 A1 | 1/2013 | Gupta | |
| 2013/0035983 A1 | 2/2013 | Kursar et al. | |
| 2013/0073473 A1 | 3/2013 | Heath | |
| 2013/0246463 A1 | 9/2013 | Trim et al. | |
| 2013/0262598 A1 | 10/2013 | Makanawala et al. | |
| 2014/0278769 A1* | 9/2014 | McCandless | G06Q 30/0201 705/7.31 |
| 2014/0337111 A1* | 11/2014 | Cama | G06Q 30/0214 705/14.16 |
| 2015/0058103 A1* | 2/2015 | Kirk | G06Q 30/0214 705/14.16 |

OTHER PUBLICATIONS

Choffnes, David R., Fabian E. Bustamante, and Zihui Ge. "Crowdsourcing service-level network event monitoring." ACM SIGCOMM Computer Communication Review. vol. 40. No. 4. ACM, 2010. http://www.sigcomm.org/sites/default/files/ccr/papers/2010/October/1851275-1851228.pdf.

Demirbas, Murat, et al. "Crowd-sourced sensing and collaboration using twitter." World of Wireless Mobile and Multimedia Networks (WoWMoM), 2010 IEEE International Symposium on a. IEEE, 2010. http://csce.uark.edu/~tingxiny/courses/5013spring13/readingList/crowdsource.pdf.

Li, Weichao, et al. "Planetopus: A system for facilitating collaborative network monitoring." Integrated Network Management (IM), 2011 IFIP/IEEE International Symposium on. IEEE, 2011. http://www4.comp.polyu.edu.hk/~oneprobe/doc/im2011-planetopus.pdf.

Hennig-Thurau, Thorsten, et al. "The impact of new media on customer relationships." Journal of Service Research 13.3 (2010): 311-330. http://cassknowledge.co.uk/sites/default/files/articleattachments/480~~thorsten_hennigthurau_ the_impact_of_new_media_on_customer.pdf.

* cited by examiner

METHOD, COMPUTER-READABLE STORAGE DEVICE, AND APPARATUS FOR ADDRESSING A PROBLEM IN A NETWORK USING SOCIAL MEDIA

BACKGROUND

Currently, monitoring of a service provider's network may include analyzing and monitoring batch data from a collection of network elements. Although each network element or portion of a network may appear to be working properly, the overall network may not be operating as expected from a customer's perspective. For example, the customer may still experience issues with the service of the service provider even though the data seems to indicate otherwise. If the customer has a poor experience with the service of the service provider, the service provider's brand may be tarnished. In addition, the relationship between the customer and the service provider may be damaged without the knowledge of the service provider.

SUMMARY

In one embodiment, the present disclosure provides a method, computer-readable storage device, and an apparatus for addressing a problem in a network using social media. In one embodiment, the method receives social media data, analyzes the social media data to detect a trend for a service provided by the communication network, wherein the trend indicates a problem with the service, correlates an operational parameter of the communication network providing the service to the problem with the service and adjusts the operational parameter of the communication network to address the problem.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer-readable storage device and apparatus for correcting a problem in a network using social media. As discussed above, monitoring of a service provider's network may include analyzing and monitoring batch data from a collection of network elements. Although each network element or portion of a network may appear to be working properly, the overall network may not be operating as expected from a customer's perspective. For example, the customer may still experience issues with the service of the service provider even though the data seems to indicate otherwise. In many instances the customers may experience an annoyance with the service, but does not actively provide such negative feedback to the service provider. As such, the customer-service provider relationship can be damaged without even the knowledge of the service provider.

Social media has become one outlet for users to voice their frustrations or dissatisfaction with a service. For example, when a user's service is not providing satisfactory service or a quality of service, the user may post a negative message on a social media website, such as for example, Facebook®, Twitter®, Yelp® and the like. Other messages may be sent by the user expressing his or her satisfaction via email, instant messaging, text messaging, blog posts, frequently asked questions (FAQ) websites, and the like. All of information and messages posted on these social media websites may provide a real-time feedback for the performance of a network of the service provider. Thus, when data or messages in the social media data are trending negatively for a particular service of the service provider, the service provider may quickly identify which service is performing poorly, identify one or more operational parameters that can be adjusted to improve the performance of the service, and make the appropriate adjustments to the operational parameters.

Figure 1:
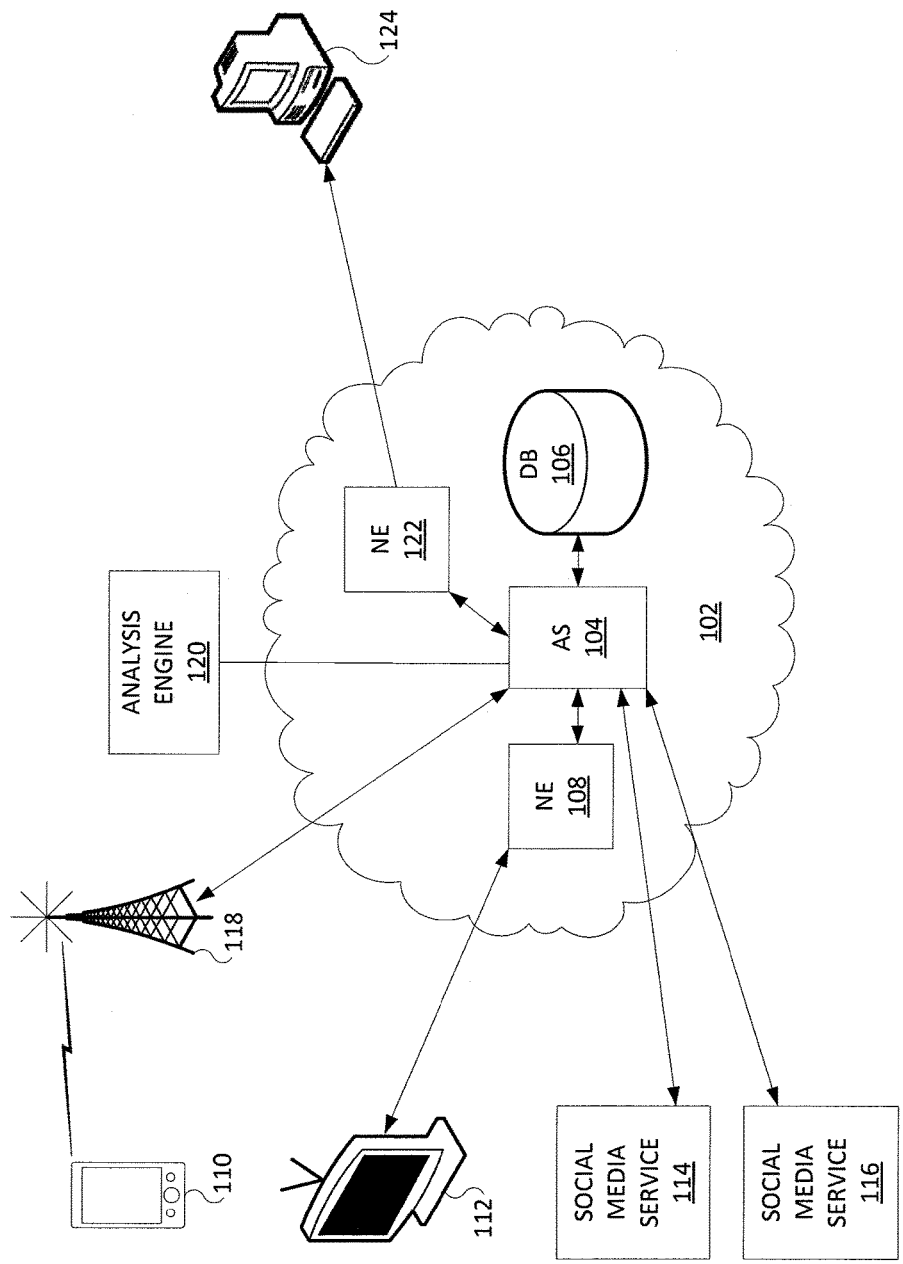
FIG. 1 illustrates one example of a communications network of the present disclosure.

FIG. 1 is a block diagram depicting one example of a communication network 100. In one embodiment, the communication network 100 may be an Internet Protocol (IP) network, a cellular communications network, a data network, cable television network, and the like, that provide one or more services to one or more subscribers. In one embodiment, the communication network 100 may include a core network 102 and one or more access networks (not shown).

In one embodiment, the core network 102 may include an application server (AS) 104, a database (DB) 106 and one or more network elements 108, 118 and 122. In one embodiment, the network elements may include an antenna or base station 118 that may be used as part of a cellular communication network to provide cellular communication services to a mobile endpoint device 110. In one embodiment, the mobile endpoint device 110 may be a mobile telephone, a smart phone, a tablet computer with cellular communication capability, and the like. In one embodiment, the network elements 108 and 122 may be a router, switch, border element, cable headend, and the like, that are part of a cable television network to provide cable television services to a television 112 or part of a data network to provide data services (e.g., an Internet service provider (ISP)) to the computer 124. It should be noted that although the network elements 108 and 122 are illustrated as being in the core network 102, it should be noted that the network elements 108 and 122 may be part of an access network (not shown) that may be the cellular communications network, the cable television network or the data network.

It should be noted that although only three network elements 108, 118 and 122 are illustrated in FIG. 1, any number of network elements (e.g., more or less) may be deployed. In addition, the example network elements described above are not intended to be limiting and may include other types of network elements not described above.

In one embodiment, the AS 104 may be deployed as a server or a general purpose computer illustrated in FIG. 3 and described below. In one embodiment, the AS 104 may perform various functions for the core network, the cellular communication network, the cable television network and/or the data network. In one embodiment, the AS 104 may perform the functions described herein. For example, the AS 104 may obtain or receive the social media data from one or more social media services 114 and 116 (e.g., web servers hosting websites) and analyze the social media data for trends. The AS 104 may also control or bring about the adjustment of one or more operational parameters of the network elements 108, 118 and 122 to correct any problems (e.g., performance related issues) with a service associated with the network elements 108, 118 or 122.

In one embodiment, the AS 104 may obtain the social media data by crawling the World Wide Web or Internet to collect publicly available posts or "tweets" on the social media websites. In another embodiment, the AS 104 may obtain the social media data by paying a data warehouse or a third party entity for the social media data.

In one embodiment, the social media services 114 and 116 may be a social media website, such as for example, Facebook®, Twitter® or Yelp® where users can post brief messages and or reviews. In one embodiment, the social media services 114 and 116 may also include blog websites, FAQ websites or data warehouses that store email messages, text messages, and the like.

In one embodiment, users of the social media services 114 and 116 may post messages about a service provided by the service provider of the communications network 100. For example, a user may post or "tweet" messages regarding his or her sentiment (e.g., satisfaction or dissatisfaction) with a service (e.g., "my cell service in New York City is so spotty," "there is so much lag on my network service for my online video game," "My t.v. guide keeps flickering when I change channel," and the like). Similar messages can be analyzed to identify trends that can indicate a potential problem with a portion of the network providing the service. The analysis of the social media data is discussed in further detail below.

In one embodiment, the DB 106 may store information regarding the operational specification or data of the network elements, e.g., the location of the network elements, the services supported by the network elements, the operational parameters of the network elements, the maintenance schedule of the network elements. The DB 106 may store accumulated operational data from the communications network 100 to validate possible problems associated with identified trends from the social media data. The DB 106 may also store information regarding which operational parameters are associated with which types of problems or complaints and how the operational parameters can be adjusted. In one embodiment, the DB 106 may store the social media data that is obtained and analyzed.

In one embodiment, an analysis engine 120 (e.g., implemented on an application server) may perform the analysis of the social media data. The analysis engine 120 may be deployed as a separate server from the AS 104 and may be located in the same network 102 as the AS 104 or located remotely from the AS 104 and the core network 102. In one embodiment, the analysis engine 120 may be a distributed file system or distributed cloud computing engine, such as for example, Hadoop®, Mango® database, and the like.

In addition, although the analysis engine 120 and the AS 104 are illustrated as being deployed as different devices in FIG. 1, it should be noted that the AS 104 and the analysis engine 120 may be part of a single physical device. For example, a single server or general purpose computer may be configured to serve as the AS 104 and the analysis engine 120.

Using either the AS 104 or the analysis engine 120, the social media data may be analyzed to identify a trend. In one embodiment, the analysis is looking to identify negative trends that can indicate that customers or subscribers are experiencing a problem with their service. In one embodiment, a trend may be detected when a number of occurrences of a key word exceed a threshold. For example, the social media data may be analyzed to identify each word in the message. Each occurrence of each word may be summed using the AS 104 or the analysis engine 120 (e.g., using a MapReduce® job on Hadoop®).

In one embodiment, the service provider may focus on select key words such as the service provider's name (e.g., AT&T®, Verizon®, and the like), a particular service (e.g., trade names used by a service provider for a particular type of service) provided by the service provider (e.g., cell phone coverage, Internet speed, television programs, data service and the like), one or more negative descriptive words (e.g., negative adjectives: terrible, bad, awful, weak, missing, delayed and the like), one or more problem words (e.g., negative verbs: lags, echoes, flickers, blanks out, slows, hangs, drops, loses, and the like), or any other words desired to be analyzed by the service provider. When a number of occurrences of a key word breach a threshold, the key word may be used to detect a trend.

In one embodiment, the number of occurrences for the key word may be tracked for a period of time (e.g., 1 hour, 1 day, 1 week, and the like) to determine if the number of occurrences exceeds a threshold. For example, if any one of the key words exceeds 50 occurrences in an hour, a trend may be identified.

In one embodiment, the service provider may look for multiple words to exceed a threshold to prevent false positives. For example, the service provider may selectively require the service provider's name (e.g., AT&T®) to exceed 100 occurrences, a service (e.g., cell phone service) to exceed 1000 occurrences, and a problem word to exceed (e.g., 1000 occurrences) in an hour. By using multiple key words, the trends may be specific enough to indicate a problem with a service and the AS 104 may then correlate or identify an operational parameter of the network providing the service that may contributed to the alleged problem. Although the above example uses only three key words, it should be noted that in some instances a single key word may be used, e.g., if a readily identifiable problem (e.g., blank screen, no signal, no service, no power and the like) exceeds a threshold, the service provider may quickly identify that a television service is experiencing a problem and the like.

In one embodiment, an operational parameter may be defined as any control, switch, algorithm, lever, and the like, that when adjusted or changed may have an effect on how the communication network operates or performs. For example, operational parameters may include physical movement of a network element such as an antenna's tilt angle, direction, placement, and the like. Operational parameters may include algorithms relating to how the network routes traffic, the type of communication protocol that is used (e.g., 2G, 3G or 4G), what types of traffic is given priority, and the like. Operational parameters may include adjusting a physical switch or lever on a router, optical switch, border element, and the like. Operational parameters may include activating backup or reserve resources, e.g., additional redundant network elements, additional base stations, using additional operating frequencies, and the like.

In one embodiment, the analysis may be only for subscribers of the service provider. For example, the social media data may be analyzed to identify whether the user that posted the social media message is a subscriber of the service provider. Thus, the service provider's analysis of the social media data may not be skewed by problems in another service provider's or a competitor's network.

Once the AS 104 correlates an operational parameter of the network providing the service that is experiencing the alleged problem, the AS 104 may make one or more adjustments to the operational parameter. In one embodiment, the AS 104 may identify a network element or network elements in which the network (e.g., the cellular network, the cable television network or the data network) providing the service is having the problem. Then based on the type of problem, the AS 104 may bring about an adjustment of the operational parameter of the network element or network elements. In another embodiment, the operational parameter may be related to an overall operation of the network and not to any specific network element or network elements within the network. For example, using alternative communication protocols, re-routing traffic from one portion of the network to another portion of the network, and the like.

To illustrate, if the detected trend is poor cell phone coverage in the New York City area based upon the social media data, the AS 104 may determine if a network element in the cellular network might be a cause of the problem. In one embodiment, the antenna 118 may not be aimed correctly. For example, the initial operational data may indicate that the antenna 118 is operating within the operational tolerance of the service provider. However, antenna 118 may be within a lower bound of the operational tolerance and may be causing poor cell phone coverage in New York City. As a result, the AS 104 may either generate an alarm to send a technician out or remotely signal the antenna to adjust an antenna angle tilt (e.g., an electrical tilt).

In another embodiment, if voice calls are being delayed the AS 104 may adjust a router in the cellular network to provide more bandwidth to voice data versus non-voice data. In another embodiment, if calls are being dropped the AS 104 may signal the cellular network to provide 3G service as a back up to an overload of the long term evolution (LTE) services. The above are only provided as examples, i.e., any operational parameter may be adjusted for any type of network elements to address the problem that is detected based on the analysis of the social media data.

It should be noted that in certain situations the adjustment that is taken to address the alleged problem may not necessarily "correct" a problem as much as minimizes the effect of the problem. In other words, certain alleged problems may be very subjective and no amount of adjustments will correct the problem. Nevertheless, an adjustment may improve the impression to the subscribers that the problem has been addressed at some level.

In one embodiment, operational data from the communication network 100 may be used to verify that the problem is occurring. For example, the operational data may lag behind what the customer is experiencing in real-time. As a result, when the analysis of the social media data detects a trend, the operational data obtained at a later time may actually confirm the problem associated with the detected trend.

In one embodiment, the AS 104 may also report the correction that was taken to address the problem. For example, the AS 104 may generate a report that identifies the operational parameter that was adjusted and the manner in which the operational parameter was adjusted. In another example, the AS 104 may report the correction by posting on a social media website where the social media data was obtained from to indicate that the problem is being corrected or was corrected.

In another example, the AS 104 may report the correction by providing a market incentive to a user that posted one or more of the social media data that was used to detect the trend. For example, to appease the user, the service provider may thank the user for identifying the problem and provide a discount or a promotional credit. The service provider may also inform the user that the problem is being corrected or has already been corrected. In one embodiment, the service provider may contact the user via the social media website, an email message, a telephone call, and the like. In another example, the AS 104 may notify the user preemptively to notify the user that the service is being temporarily interrupted to correct the problem noted by the user's social media data and/or provide a discount or credit to appease the user.

As a result, a service provider may use the communication network 100 to analyze social media data to detect problems in the service provider's network. The service provider may then correct the problem by adjusting an operational parameter of a network element in a portion of the network providing the service that is experiencing the problem. Thus, reliability of the network is maintained using real-time feedback of its customers and customer satisfaction is improved.

The above communication network 100 is described to provide an illustrative environment in which packets for voice, data, text messages and multimedia services are transmitted on networks. The communication network 100 has also been simplified and may include other network elements that are not described herein, such as firewalls, routers, switches, border elements, gateways, and the like. The current disclosure discloses a method, computer-readable storage device, and apparatus for correcting a problem in an example network illustrated in FIG. 1, and as described above, using social media.

Figure 2:
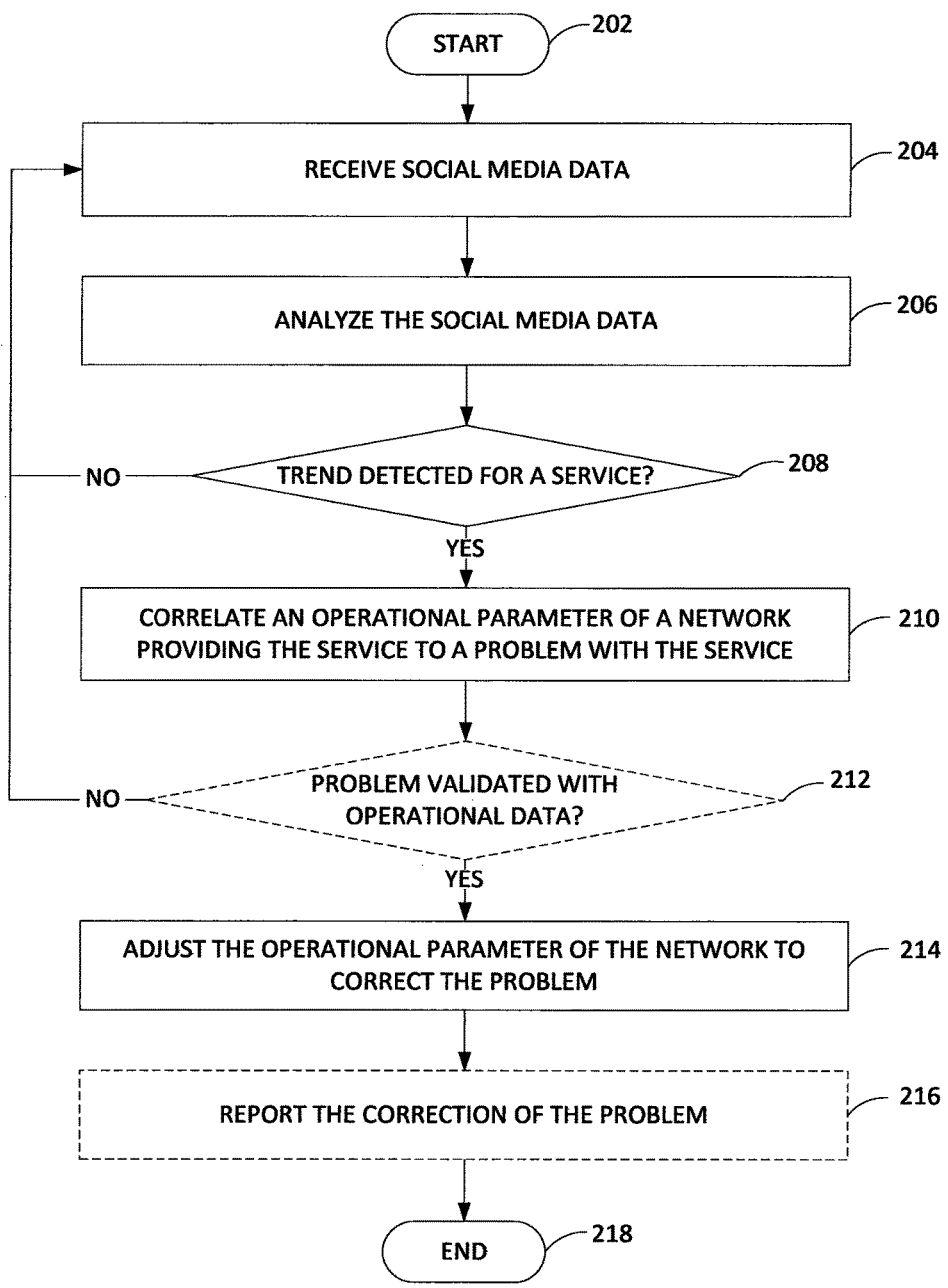
FIG. 2 illustrates an example flowchart of a method for managing a network based on social media.

FIG. 2 illustrates a flowchart of a method 200 for correcting a problem in a network using social media. In one embodiment, the method 200 may be performed by the AS 104, the analysis engine 120 or a general purpose computer as illustrated in FIG. 3 and discussed below.

The method 200 begins at step 202. At step 204, the method 200 receives social media data. For example, the social media data may be received from one or more different social media services or websites by crawling the Internet to obtain the social media data or paying a data warehouse or third party entity for receiving the social media data. The social media data may also be from a plurality of different users that post messages or use the one or more different social media services or websites. In one embodiment, the method 200 may filter the social media data to only analyze social media data from the plurality of different users that are also subscribers of a service provided by the service provider.

At step 206, the method 200 analyzes the social media data. For example, the social media data may be analyzed to identify a trend. In one embodiment, the analysis is looking to identify negative trends that can indicate that customers or subscribers are experiencing a problem with a service provided by the service provider. In one embodiment, a trend may be detected when a number of occurrences of a key word exceed a threshold. For example, the social media data may be analyzed to identify each word in the message. Each occurrence of each word may be summed using an AS or an analysis engine (e.g., using a MapReduce job on Hadoop®).

In one embodiment, the service provider may focus on select key words such as the service provider's name (e.g., AT&T®, Verizon®, and the like), a particular service (e.g., trade names used by a service provider for a particular type of service) provided by the service provider (e.g., cell phone coverage, Internet speed, television programs, data service and the like), one or more negative descriptive words (e.g., negative adjectives: terrible, bad, awful, weak, missing, delayed and the like), one or more problem words (e.g., negative verbs: lags, echoes, flickers, blanks out, slows, hangs, drops, loses, and the like), or any other words desired to be analyzed by the service provider. When a number of occurrences of a key word breach a threshold, the key word may be used to detect a trend.

In one embodiment, the number of occurrences for the key word may be tracked for a period of time (e.g., 1 hour, 1 day, 1 week, and the like) to determine if the number of occurrences exceeds a threshold. For example, if any one of the key words exceeds 50 occurrences in an hour, then a trend may be identified.

In one embodiment, the service provider may look for multiple words to exceed a threshold to prevent false positives. For example, the service provider may require the service provider's name (e.g., AT&T®) to exceed 100 occurrences, a service (e.g., cell phone service) to exceed 1000 occurrences, and a problem word to exceed (e.g., 1000 occurrences) in an hour. Although the above example uses only three key words, it should be noted that in some instances a single key word may be used, e.g., if a readily identifiable problem (e.g., blank screen, no signal, no service, no power and the like) exceeds a threshold, the service provider may quickly identify that a television service is experiencing a problem and the like.

At step 208, the method 200 determines if a trend is detected for a service. If no trend is detected, the method 200 may return to step 204 and continue to receive social media data. However, if a trend is detected at step 208, the method 200 may proceed to step 210.

At step 210, the method 200 correlates an operational parameter of a network providing the service to a problem with the service. For example, the trends may be specific enough to indicate a problem with a particular service and the method 200 may then correlate an operational parameter of the network providing the particular service to the problem.

In one embodiment, the method 200 may identify a single network element or a plurality of network elements in which the network (e.g., the core network, the cellular network, the cable television network or the data network) providing the service is causing the alleged problem. In another embodiment, the operational parameter may be correlated to the overall operation of the network and not to any particular network element or network elements within the network.

At optional step 212, the method 200 may validate the problem with operational data from the network. For example, the operational data (e.g., data from a network element thought to be causing the problem in the network) may be analyzed to confirm that the alleged problem exists. The validation may help filter false positives. At optional step 212, if the problem is not validated by the operational data, the method 200 may return to step 204 where the method 200 receives more social media data to analyze.

However, at optional step 212, if the method 200 does validate the problem with the operational data, the method 200 may proceed to step 214. At step 214, the method 200 adjusts the operational parameter of the network to correct the problem. For example, one or more network elements may be identified as possibly causing the problem of the network. Based upon a correlation of the operational parameter to the problem, the operational parameter may be adjusted to correct or minimize the problem.

For example, if the detected trend is poor cell phone coverage in the New York City area based upon the social media data, the method 200 may determine if a malfunctioning network element in the cellular network might be a cause of the problem. In one embodiment, an antenna may not be aimed correctly. For example, the initial operational data may indicate that the antenna is operating within the operational tolerance of the service provider. However, the antenna may be within a lower bound of the operational tolerance and may be causing poor cell phone coverage in New York City. As a result, the method 200 may either generate an alarm to send a technician to service the antenna or remotely signal the antenna to adjust an antenna angle tilt (e.g., electrical tilt).

In another embodiment, if voice calls are being delayed the method 200 may adjust a router in the cellular network to provide more bandwidth to voice data versus non-voice data. In another embodiment, if calls are being dropped the method 200 may signal the cellular network to provide 3G service as a back up to an overload of the long-term evolution (LTE) services. The above are only provided as examples, any operational parameter may be adjusted for any type of network elements to correct the problem that is detected based on the analysis of the social media data.

At optional step 216, the method 200 may report the correction of the problem. For example, the method 200 may generate a report that identifies the operational parameter that was adjusted and the manner in which the operational parameter was adjusted. In another example, the method 200 may report the correction by posting on a social media website where the social media data was obtained from indicating that the problem is being corrected or has been corrected. In another example, the method 200 may report the correction by providing a market incentive to a user that posted one or more of the social media data that was used to detect the trend. For example, to appease the user, the service provider may thank the user for identifying the problem and provide a discount or a promotional credit. The service provider may inform the user that the problem is being corrected or has been corrected.

In one embodiment, the service provider may contact the user via the social media website, an email message, a telephone call, and the like. In another example, the method 200 may notify the user preemptively to notify the user that the service is being temporarily interrupted to correct the problem noted by the user's social media data and/or provide a discount or credit to appease the user. At step 218, the method 200 ends.

It should be noted that although not explicitly specified, one or more steps or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step.

Figure 3:
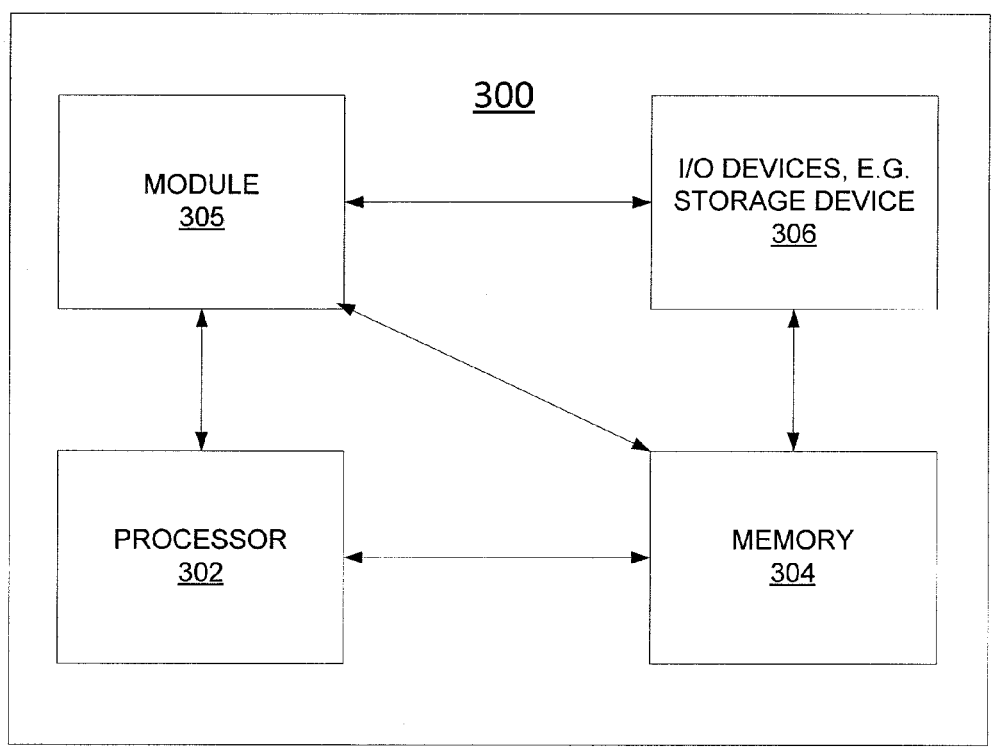
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for correcting a problem in a network using social media, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for correcting a problem in a network using social media (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for correcting a problem in a network using social media (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for addressing a problem in a communication network using social media, the method comprising:
   receiving, by a processor of an application server, social media data;
   analyzing, by the processor, the social media data to detect a trend for a service provided by the communication network, wherein the trend indicates a problem with the service, wherein the service comprises a cellular communication service, a television service, or a data service;
   correlating, by the processor, an operational parameter of the communication network providing the service to the problem with the service indicated by the trend detected from the social media data;
   in response to the correlating, validating, by the processor, using operational data obtained from the communication network, the problem with the service that is detected from the trend;
   adjusting, by the processor, in response to the validating, the operational parameter of the communication network to address the problem, wherein the adjusting the operational parameter of the communication network comprises: selecting a different type of communication protocol used by the communication network or activating a backup resource of the communication network; and
   posting, by the processor, in response to the adjusting the operational parameter, a message on a social media website from which the social media data was obtained, the message indicating that the problem has been addressed.

2. The method of claim 1, further comprising:
   generating, by the processor, a report indicating the operational parameter that was adjusted and a manner in which the operational parameter was adjusted.

3. The method of claim 1, further comprising:
   providing, by the processor, a marketing incentive to a user who posted the social media data that was used to detect the trend.

4. The method of claim 1, wherein the social media data is obtained from a plurality of different social media websites from a plurality of different users.

5. The method of claim 4, wherein each one of the plurality of different users is a subscriber of the service.

6. The method of claim 1, wherein the trend is detected when a number of occurrences of a key word reaches a threshold.

7. The method of claim 1, wherein the communication network comprises a cellular communication network.

8. The method of claim 1, wherein the communication network comprises a cable television network.

9. The method of claim 1, wherein the communication network comprises a data network.

10. A computer-readable storage device storing a plurality of instructions which, when executed by a processor of an application server, cause the processor to perform operations for addressing a problem in a communication network using social media, the operations comprising:
    receiving social media data;
    analyzing the social media data to detect a trend for a service provided by the communication network, wherein the trend indicates a problem with the service, wherein the service comprises a cellular communication service, a television service, or a data service;

correlating an operational parameter of the communication network providing the service to the problem with the service indicated by the trend detected from the social media data;

in response to the correlating, validating using operational data obtained from the communication network, the problem with the service that is detected from the trend;

adjusting, in response to the validating, the operational parameter of the communication network to address the problem, wherein the adjusting the operational parameter of the communication network comprises: selecting a different type of communication protocol used by the communication network or activating a backup resource of the communication network; and posting, in response to the adjusting the operational parameter, a message on a social media website from which the social media data was obtained, the message indicating that the problem has been addressed.

11. The computer-readable storage device of claim 10, the operations further comprising:

generating a report indicating the operational parameter that was adjusted and a manner in which the operational parameter was adjusted.

12. The computer-readable storage device of claim 10, the operations further comprising:

providing a marketing incentive to a user who posted the social media data that was used to detect the trend.

13. The computer-readable storage device of claim 10, wherein the social media data is obtained from a plurality of different social media websites from a plurality of different users.

14. The computer-readable storage device of claim 13, wherein each one of the plurality of different users is a subscriber of the service.

15. The computer-readable storage device of claim 10, wherein the trend is detected when a number of occurrences of a key word reaches a threshold.

16. An apparatus for addressing a problem in a communication network using social media, the apparatus comprising:

a processor of an application server; and a computer-readable storage device storing a plurality of instructions which, when executed by the processor, cause the processor to perform operations, the operations comprising:

receiving social media data;

analyzing the social media data to detect a trend for a service provided by the communication network, wherein the trend indicates a problem with the service, wherein the service comprises a cellular communication service, a television service, or a data service;

correlating an operational parameter of the communication network providing the service to the problem with the service indicated by the trend detected from the social media data;

in response to the correlating, validating using operational data obtained from the communication network, the problem with the service that is detected from the trend;

adjusting, in response to the validating, the operational parameter of the communication network to address the problem, wherein the adjusting the operational parameter of the communication network comprises: selecting a different type of communication protocol used by the communication network or activating a backup resource of the communication network; and posting, in response to the adjusting the operational parameter, a message on a social media website from which the social media data was obtained, the message indicating that the problem has been addressed.

17. The apparatus of claim 16, wherein the operations further comprise:

generating a report indicating the operational parameter that was adjusted and a manner in which the operational parameter was adjusted.

18. The apparatus of claim 16, wherein the operations further comprise:

providing a marketing incentive to a user who posted the social media data that was used to detect the trend.

19. The apparatus of claim 16, wherein the social media data is obtained from a plurality of different social media websites from a plurality of different users.

20. The apparatus of claim 19, wherein each one of the plurality of different users is a subscriber of the service.

* * * * *